US012673274B2

(12) United States Patent
Petroff et al.

(10) Patent No.:    US 12,673,274 B2
(45) Date of Patent:        Jul. 7, 2026

(54) SYSTEMS AND METHODS FOR CRYOGENIC REFRIGERATION

(71) Applicant: 1372934 B.C. Ltd., Burnaby (CA)

(72) Inventors: Jacob Craig Petroff, Burnaby (CA); Richard G. Harris, North Vancouver (CA)

(73) Assignee: 1372934 B.C. LTD., Burnaby (CA)

( * ) Notice: Subject to any disclaimer, the term of this patent is extended or adjusted under 35 U.S.C. 154(b) by 527 days.

(21) Appl. No.: 18/136,733

(22) Filed: Apr. 19, 2023

(65) Prior Publication Data

US 2023/0271105 A1    Aug. 31, 2023

Related U.S. Application Data

(60) Continuation of application No. 16/663,723, filed on Oct. 25, 2019, now abandoned, which is a division of (Continued)

(51) Int. Cl.
*F25B 9/12*        (2006.01)
*B01D 8/00*        (2006.01)
(Continued)

(52) U.S. Cl.
CPC ................. *B01D 8/00* (2013.01); *F25B 9/10* (2013.01); *F25B 9/12* (2013.01); *F25B 9/14* (2013.01); *F25B 9/145* (2013.01); *F25D 19/006* (2013.01)

(58) Field of Classification Search
CPC ......... B01D 8/00; B01D 2256/18; F25B 9/14; F25B 9/145; F25B 9/12; F25B 9/10; F25J 3/08; F25J 2215/30

(Continued)

(56)                References Cited

U.S. PATENT DOCUMENTS 2,831,549 A    4/1958  Daniel
2,982,106 A    5/1961  Ernest
(Continued)

FOREIGN PATENT DOCUMENTS

CN        103017393 A    4/2013
CN        103249368 B    1/2016
(Continued)

OTHER PUBLICATIONS

Alfa Aesar, "41825 Palladium, 5% on 3mm alumina pellets" https://www.alfa.com/en/catalog/041825/, 4 pages.
(Continued)

*Primary Examiner* — John F Pettitt, III
(74) *Attorney, Agent, or Firm* — Cozen O'Connor

(57)                ABSTRACT

Systems and methods for improving the performance of dilution refrigeration systems are described. Filters and traps employed in the helium circuit of a dilution refrigerator may be modified to improve performance. Some traps may be designed to harness cryocondensation as opposed to cryoadsorption. A cryocondensation trap employs a cryocondensation surface having a high thermal conductivity and a high specific heat with a binding energy that preferably matches at least one contaminant but does not match helium. Multiple traps may be coupled in series in the helium circuit, with each trap designed to trap a specific contaminant or set of contaminants. Both cryocondensation and cryoadsorption may be exploited among multiple traps.

14 Claims, 2 Drawing Sheets

Related U.S. Application Data application No. 14/086,697, filed on Nov. 21, 2013, now abandoned.

(60) Provisional application No. 61/736,456, filed on Dec. 12, 2012, provisional application No. 61/729,250, filed on Nov. 21, 2012.

(51) Int. Cl.
| | |
|---|---|
| *F25B 9/10* | (2006.01) |
| *F25B 9/14* | (2006.01) |
| *F25D 19/00* | (2006.01) |

(58) Field of Classification Search
USPC .......................................................... 62/6
See application file for complete search history.

(56) References Cited

U.S. PATENT DOCUMENTS

| | | | | |
|---|---|---|---|---|
| 3,112,878 | A | | 12/1963 | Snelling |
| 3,195,322 | A | | 7/1965 | Heinz |
| 3,195,332 | A | | 7/1965 | Ranauto |
| 3,340,669 | A | | 9/1967 | Farquharson |
| 3,340,699 | A | | 9/1967 | Post et al. |
| 3,376,712 | A | | 4/1968 | Heinz |
| 3,415,069 | A | | 12/1968 | Hauser |
| 3,517,521 | A | * | 6/1970 | Emerson .............. F25J 3/04642 |
| | | | | 95/138 |
| 3,552,485 | A | | 1/1971 | Jannou et al. |
| 3,653,220 | A | * | 4/1972 | Foster ................... F25J 3/0635 |
| | | | | 95/114 |
| 3,656,313 | A | * | 4/1972 | Low ......................... F25B 9/10 |
| | | | | 62/85 |
| 3,712,074 | A | | 1/1973 | Boissin |
| 3,717,201 | A | * | 2/1973 | Hosmer ................ F02G 1/0445 |
| | | | | 62/383 |
| 3,788,096 | A | | 1/1974 | Brilloit |
| 3,854,913 | A | | 12/1974 | Leyarovski et al. |
| 4,366,676 | A | | 1/1983 | Wheatley et al. |
| 4,400,183 | A | | 8/1983 | Henrich et al. |
| 4,506,513 | A | | 3/1985 | Max |
| 4,679,402 | A | | 7/1987 | Andeen |
| 4,717,406 | A | | 1/1988 | Giacobbe |
| 4,770,004 | A | | 9/1988 | Lagodmos |
| 4,770,006 | A | | 9/1988 | Roach et al. |
| 4,771,823 | A | | 9/1988 | Chan |
| 4,907,413 | A | | 3/1990 | Clarkson et al. |
| 4,986,077 | A | | 1/1991 | Saho et al. |
| 5,172,554 | A | | 12/1992 | Swift et al. |
| 5,447,033 | A | | 9/1995 | Nagao et al. |
| 5,450,729 | A | | 9/1995 | Hilton |
| 5,611,208 | A | | 3/1997 | Hemmerich et al. |
| 5,671,612 | A | | 9/1997 | Menzenski |
| 5,780,314 | A | | 7/1998 | Chan |
| 5,956,957 | A | | 9/1999 | Lowry et al. |
| 6,276,144 | B1 | | 8/2001 | Marland et al. |
| 6,332,925 | B1 | | 12/2001 | Noji et al. |
| 6,378,312 | B1 | | 4/2002 | Wang |
| 6,383,257 | B1 | | 5/2002 | McDermott et al. |
| 6,629,417 | B2 | | 10/2003 | Haas et al. |
| 6,651,653 | B1 | | 11/2003 | Honkonen et al. |
| 6,803,599 | B2 | | 10/2004 | Amin et al. |
| 6,968,713 | B2 | | 11/2005 | Corrigan |
| 6,996,994 | B2 | | 2/2006 | Wang |
| 7,149,534 | B2 | | 12/2006 | Bloebaum et al. |
| 7,162,877 | B2 | | 1/2007 | Daniels |
| 7,323,963 | B2 | | 1/2008 | Nemoto et al. |
| 7,506,504 | B2 | | 3/2009 | Kumar |
| 7,533,068 | B2 | | 5/2009 | Maassen et al. |
| 7,619,437 | B2 | | 11/2009 | Thom et al. |
| 8,159,313 | B2 | | 4/2012 | Uchaykin |
| 8,190,548 | B2 | | 5/2012 | Choi |
| 8,195,596 | B2 | | 6/2012 | Rose et al. |
| 8,279,022 | B2 | | 10/2012 | Thom et al. |

| | | | | |
|---|---|---|---|---|
| 8,441,329 | B2 | | 5/2013 | Thom et al. |
| 8,464,542 | B2 | | 6/2013 | Hilton et al. |
| 9,015,215 | B2 | | 4/2015 | Berkley et al. |
| 9,134,047 | B2 | | 9/2015 | Black et al. |
| 9,234,691 | B2 | | 1/2016 | Black et al. |
| 9,334,859 | B2 | | 5/2016 | Dresens et al. |
| 9,528,744 | B2 | | 12/2016 | Frossati |
| 10,378,803 | B2 | | 8/2019 | Uchaykin |
| 2003/0024250 | A1 | | 2/2003 | Haas et al. |
| 2004/0011074 | A1 | | 1/2004 | Sano et al. |
| 2004/0089017 | A1 | | 5/2004 | Mikheev et al. |
| 2004/0221586 | A1 | | 11/2004 | Daniels |
| 2005/0051420 | A1 | | 3/2005 | Botvinnik et al. |
| 2005/0086974 | A1 | | 4/2005 | Steinbach et al. |
| 2006/0097146 | A1 | | 5/2006 | Strobel |
| 2006/0248618 | A1 | | 11/2006 | Berkley |
| 2007/0107445 | A1 | | 5/2007 | Boesel et al. |
| 2007/0121272 | A1 | | 5/2007 | Vladimir et al. |
| 2008/0176750 | A1 | | 7/2008 | Rose et al. |
| 2008/0238531 | A1 | | 10/2008 | Harris |
| 2009/0102580 | A1 | | 4/2009 | Uchaykin |
| 2009/0121215 | A1 | | 5/2009 | Choi |
| 2010/0157552 | A1 | | 6/2010 | Thom et al. |
| 2010/0263358 | A1 | | 10/2010 | Chen et al. |
| 2010/0281885 | A1 | | 11/2010 | Black et al. |
| 2011/0219785 | A1 | | 9/2011 | Black et al. |
| 2011/0283737 | A1 | | 11/2011 | Alvord et al. |
| 2012/0135867 | A1 | | 5/2012 | Thom et al. |
| 2013/0231249 | A1 | | 9/2013 | Black et al. |
| 2014/0137571 | A1 | | 5/2014 | Petroff et al. |
| 2014/0326001 | A1 | | 11/2014 | Citver et al. |
| 2015/0013349 | A1 | * | 1/2015 | Dong ......................... F25J 3/08 |
| | | | | 62/617 |
| 2015/0153427 | A1 | | 6/2015 | Garside et al. |
| 2016/0091245 | A1 | * | 3/2016 | Millan ....................... F25J 3/08 |
| | | | | 62/6 |
| 2017/0211859 | A1 | * | 7/2017 | Blaauwgeers ........... F25B 9/10 |
| 2017/0227267 | A1 | | 8/2017 | Uchaykin |

FOREIGN PATENT DOCUMENTS

| | | | | |
|---|---|---|---|---|
| CN | 105765320 | A | | 7/2016 |
| EP | 2493553 | B1 | | 9/2013 |
| FR | 2914050 | A1 | | 9/2008 |
| GB | 1025385 | A | | 4/1966 |
| GB | 1095991 | A | | 12/1967 |
| GB | 2493553 | B | | 9/2017 |
| JP | H0379960 | A | | 4/1991 |
| JP | H04131689 | A | * | 5/1992 |
| JP | H04158175 | A | * | 6/1992 |
| JP | H0652140 | B2 | * | 7/1994 | ................ F25J 3/08 |
| JP | 2694377 | B2 | * | 12/1997 |
| JP | 2001248964 | A | * | 9/2001 | ................ F25J 3/08 |
| JP | 2006063898 | A | | 3/2006 |
| JP | 2007154785 | A | | 6/2007 |
| WO | 9428314 | A1 | | 12/1994 |
| WO | 2006051251 | A1 | | 5/2006 |
| WO | 2009086430 | A2 | | 7/2009 |
| WO | 2010002884 | A2 | | 1/2010 |
| WO | 2013190263 | A1 | | 12/2013 |
| WO | 2014081932 | A1 | | 5/2014 |
| WO | 2015041726 | A1 | | 3/2015 |
| WO | 2015163703 | A1 | | 10/2015 |
| WO | 2016005463 | A1 | | 1/2016 |
| WO | 2016210018 | A1 | | 12/2016 |

OTHER PUBLICATIONS

Burger et al., "165 K Microcooler Operating with a Sorption Compressor and a Micromachined Cold Stage", Cryocoolers 11:551-560, 2001.

Calderoni, "Selecting Getters for Cryogenic Devices, Cryogenic Society of America Cold Facts", vol. 33, No. 3, Jun. 2017.

Continentino et al., "A solid state Pomeranchuk refrigerator", Science Direct, Mar. 17, 2005.

Craig et al., "Hitch hiker's Guide to Dilution Refrigerator", Marcus Lab, Harvard University, Aug. 21, 2004.

(56) References Cited

OTHER PUBLICATIONS

Devlin et al., "A high capacity completely closed-cycle 250 mK 3He refrigeration system based on a pulse tube cooler", Cryogenics 44:611-616, 2004.

Ekin, "Experimental Techniques for Low-Temperature Measurements: Cryostat Design, Material Properties and Superconductor Critical-Current Testing", National Institute of Standards and Technology, 2006.

F. Pobell, "The 3He—4He Dilution Refrigerator", Matter and Methods at Low Temperatures, chapter 7, Springer-Verlag, 2nd Edition, 1996.

Harris, "Modern Vacuum Practice 3rd edition", Jan. 1, 2007.

Jiao, et al., "Advances in spacecraft micro-vibration suppression methods", Progress in Aerospace sciences 138 (2023) 100898, 34 pages.

Magnicon, Physical research and instrumentation "MFFT-1 Noise Thermometer", Mar. 2011, 2 pages.

Palladium(II) Oxide (last edited on Jul. 1, 2020—Wikipedia).

Qiu et al., "Performance improvement of a pulse tube cooler below 4 K by use of GdAlO3 regenerator material", Cryogenics 41:693-696, 2001.

Rothfuss, et al., "Noise thermometry at ultra-low temperatures", The Royal Society, Publishing Jul. 18, 2023, 7 pages . . . .

Saes, "Technical Specification: ST820/ENV/1—Lothar (SAES Code 5F8005)", 2 pages.

SaesGatters, "ST 820 Hydrogen Getter Tech Note" (retrieved and saved Mar. 2, 2021), 3 pages.

SaesGroup, "Operating Instructions for St820 Getter (Lothar)"—(retrieved and saved Mar. 2, 2021), 1 page.

Sivokon et al., "Operating features of a dilution refrigerator with condensation pumping", Low Temp. Phys. 19 (4):312-316, 1993.

Kirichek, et al., "Operation of superconducting magnet with dilution refrigerator insert in zero boil-off regime", Elsevier, Cryogenics 50 (2010) 666-669.

Aluminum Oxide Moisture Sensor, website: https://industrialphysics.com/knowledgebase/articles/aluminium-oxide-moisture-sensor/.

Boudiba, et al., "Sensing Mechanism of Hydrogen Sensors Based on Palladium-loaded Tungsten", Sensors and Actuators B 187, pp. 84-93, 2013.

Chu, et al., "Highly Sensitive Hydrogen Gas Sensor Based on a M0S2-Pt Nanoparticle Composite", Video Proceedings of Advanced Materials, vol. 1, Nov. 2, 2020, 3 pages.

Gottam, et al., "Highly Sensitive Hydrogen Gas Sensor Based on a M0S2-Pt Nanoparticle Composite", Applied Surface Science 506, 2020, 7 pages.

Kim, et al., "Hydrogen Sensor Using the Pd Film Supported on Anodic Aluminum Oxide", International Journal of Hydrogen Energy 39 (29), p. 16500-16505, Oct. 2, 2014.

Barcucci, "A Dry Dilution Refrigerator for the Test of CUORE Components", Journal of Low Temperature Physics, 157, 2009, pp. 541-549.

Bonnet, "Development and test of a cryogenic pulsating heat pipe and a pre-cooling system", AIP Conference Proceedings 1434, Jun. 12, 2012, pp. 607-614.

Chapman, "Cryogen-free cryostat for neutron scattering sample environment", Cryogenics 51, Jan. 15, 2011, pp. 146-149.

Day, "Basics and Applications of Cryopumps, Forschungszentrum Karlsruhe", Institute of Technical Physics, Germany, 2007.

Doyle, Buffer-gas Loading and Magnetic Trapping of Molecules, The Expanding Frontier of Atomic Physics, 2003, 11 pages.

Green, "Re-condensation and Liquiefaction of Helium and Hydrogen Using Coolers", AIP Conference Proceedings 1218, Apr. 9, 2010, pp. 703-710.

Green, "Cryogenic Refrigeration Requirements for Superconducting Insertion Devices in a Light Source", Lawrence Berkeley National Laboratory, 53578, Aug. 15, 2003, 52 pages.

Green, "Tests of Four PT-415 Coolers Installed in the Drop-in Mode", Proceeding of ICEC-22, Jul. 21-25, 2008, 7 pages.

Hartnett, "Ultra-low vibration pulse-tube cryocooler stabilized cryogenic sapphire oscillator with 10-16 fractional frequency stability", arXiv:1004.2886v2 [Physics.ins-det], Sep. 1, 2010.

Kirichek, "Impact of the cryogen free revolution on neutron scattering laboratories", Modern Physics Letters B, vol. 26, No. 12, 2012, 13 pages.

Kirichek, "Cryogen free low temperature sample environment for neutron scattering experiments", Journal of Physics: Conference Series 150, 012022, 2009, 5 pages.

Luchier, "Adiabatic Demagnetisation Refrigeration for Subkelvin Cooling in Space," CLEFS CEA—No. 56—Winter 2007-2008.

Sirbi, "Cryogenic System Design for A Hydrogen Sorption Cooler", Advances in Cryogenic Engineering, vol. 47 (2002), pp. 1217-1224.

Taylor, "An Efficient Cooling Loop for Connecting Cryocooler to a Helium Reservoir", Lawrence Berkley National Laboratory, Sep. 21, 2003.

Uglig, "Cryogen-free dilution refrigerator with separate 1K cooling circuit", AIP Conference Proceedings 1434, 2012, pp. 1823-1829.

Uglig, "Dry Dilution Refrigerator with High Cooling Power", AIP Conference Proceedings 985, Mar. 16, 2008, pp. 1287-1291.

Uhlig, "Cryogen-Free Dilution Refrigerator with 1K Stage", Cryocoolers 17, International Cryocooler Conference, Inc., 2012, pp. 471-477.

Uhlig, "Dilution Refrigerator with Direct Pulse Tube Precooling", Cryocoolers 15, International Cryocooler Conference, Inc., 2009, pp. 491-495.

Wang, "A helium liquefier using three 4 k pulse tube cryocoolers", AIP Conference Proceedings 1434, pp. 1640-1646, Jun. 12, 2012.

Wang, "A Helium Re-Liquefier for Recovering and Liquefying Helium Vapor from Cryostat", AIP Conference Proceedings 1218, pp. 687-694, Apr. 9, 2010.

Wikus, "Dilution Refrigeration of Multi-Ton Cold Masses, Dissertation", Faculty of Physics, Technischen Universitat Wien (Vienna University of Technology), Apr. 23, 2007, 174 pages.

Yamanaka, "Development of GM cryocooler separate type liquid-heliumfree 3He—4He dilution refrigerator system", Journal of Physics: Conference Series 150, 012055, 2009, 5 pages.

Yuan, "Cryocooler Contamination Study: Temperature Dependence of Outgassing", BAE Systems, Cryogenic Products Sylmar, USA, 2000.

* cited by examiner

SYSTEMS AND METHODS FOR CRYOGENIC REFRIGERATION

BACKGROUND

Field

The present systems and methods generally relate to cryogenic refrigeration technology, and particularly relate to cryogenic trapping systems and methods for removing contaminants from cryogen circuits.
Refrigeration Temperature is a property that can have a great impact on the state and evolution of a physical system. For instance, environments of extreme heat can cause even the strongest and most solid materials to melt away or disperse as gas. Likewise, a system that is cooled to cryogenic temperatures may enter into a regime where physical properties and behavior differ substantially from what is observed at room temperature. In many technologies, it can be advantageous to operate in this cryogenic regime and harness the physical behaviors that are realized in the realm of cold. The various embodiments of the systems, methods and apparatus described herein may be used to provide and maintain the cryogenic environments necessary to take advantage of the physics at cold temperatures.

Throughout this specification and the appended claims, the term "cryogenic" is used to refer to the temperature range of 0 to about 93K. A variety of technologies may be implemented to produce an environment with cryogenic temperature, though a commonly used device that is known in the art is the dilution refrigerator. Dilution refrigerators can even be used to achieve extreme cryogenic temperatures below 50 mK. In the operation of a typical dilution refrigerator, the apparatus itself requires a background temperature of about 4K. In order to provide this background cooling, the apparatus may be, e.g., immersed in an evaporating bath of liquid helium-4 ("$^4$He") or, e.g., coupled to another type of refrigeration device, such as a pulse-tube cryocooler. The dilution refrigerator apparatus may comprise a series of heat exchangers and chambers that allow the temperature to be lowered further to a point where a mixture of $^3$He and $^4$He separates into two distinct phases and pure $^3$He can move into a mixture of $^3$He and $^4$He in a process analogous to evaporation, providing cooling and allowing a temperature of around 10 mK to be achieved. Full details on this dilution effect and the operation of typical dilution refrigerators may be found in F. Pobell, *Matter and Methods at Low Temperatures*, Springer-Verlag Second Edition, 1996, pp. 120-156.

In most dilution refrigerator designs, mechanical pumps and compressors, and an external gas-handling system, are used to circulate $^3$He such that it is warmed from the lowest temperature in the fridge up above cryogenic temperatures and towards room temperature before it is returned to the low temperature. The pumps and compressors used are large, expensive, noisy, in need of periodic maintenance, and they inevitably add contaminants, such as air (i.e., nitrogen, oxygen, carbon dioxide, argon, etc.) to the helium. These contaminants typically have higher freezing points than the helium and so may solidify in the helium fluid channels, creating blockages. Such blockages may plug fine capillaries in the dilution refrigerator, causing problems with reliability. Plugging often requires a complete warm-up of a dilution refrigerator in order to remove the contaminants and restore the fridge to normal operations. The procedure of warming and subsequently cooling back down to operating temperatures can take several days. Filters and cold traps can be used to reduce the frequency of plugging by removing contaminants from the helium, but current filters and traps used in the art are of limited effectiveness. Thus, plugging due to contaminants remains a serious technical challenge in cryogenic refrigeration technology affecting fridge performance, and there remains a need in the art for improved systems and methods for contaminant filtering and/or trapping in cryogenic refrigeration systems.

BRIEF SUMMARY

A dilution refrigeration system may be summarized as including a dilution refrigerator including a helium circuit; a secondary cold source configured to provide cooling power at at least one temperature between about 4K and about 77K; and at least a first trap coupled in series with the helium circuit, wherein the first trap comprises a first trap volume and at least one cryocondensation surface inside the first trap volume, the at least one cryocondensation surface formed of a material having a high thermal conductivity and a high specific heat, and wherein the at least one cryocondensation surface is thermally coupled to the secondary cold source. The first trap volume may include multiple cryocondensation surfaces to provide a large surface area in the first trap volume. The secondary cold source may include a pulse tube cryocooler. The dilution refrigeration system may further include a second trap coupled in series with the helium circuit, wherein the second trap comprises a second trap volume and an adsorptive material inside the second trap volume. The second trap may be thermally coupled to the secondary cold surface. The dilution refrigeration system may further include a tertiary cold source configured to provide cooling power at at least one temperature between about 4K and about 77K, wherein the second trap is thermally coupled to the tertiary cold source. The tertiary cold source may include a pulse tube cryocooler. The tertiary cold source may include a bath of liquid cryogen. The dilution refrigerator may be thermally coupled to the secondary cold source.

A cryogenic trapping system may be summarized as including a cryoadsorption trap including an adsorption material and a plurality of thermalization surfaces interposed throughout the adsorption material, wherein the thermalization surfaces form a circuitous route through the adsorption material through which gas flows; and a cryocondensation trap coupled in series with the cryoadsorption trap, wherein the cryocondensation trap includes a length of tubing that is at least partially filled with a high surface area cryocondensation material. The cryoadsorption trap and the cryocondensation trap may both be thermally coupled to a first temperature stage in a cryogenic refrigeration system. The cryogenic trapping system may further include at least two parallel trapping subsystems both coupled in series with the cryoadsorption trap, wherein the at least two parallel trapping subsystems are each controllably thermally coupleable to a second temperature stage in the cryogenic refrigeration system via a respective heat switch, and wherein the second temperature stage of the cryogenic refrigeration system is warmer than the first temperature stage of the cryogenic refrigeration system. The at least two parallel trapping subsystems may each employ at least one of cryoadsorption and/or cryocondensation.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION

Figure 1:
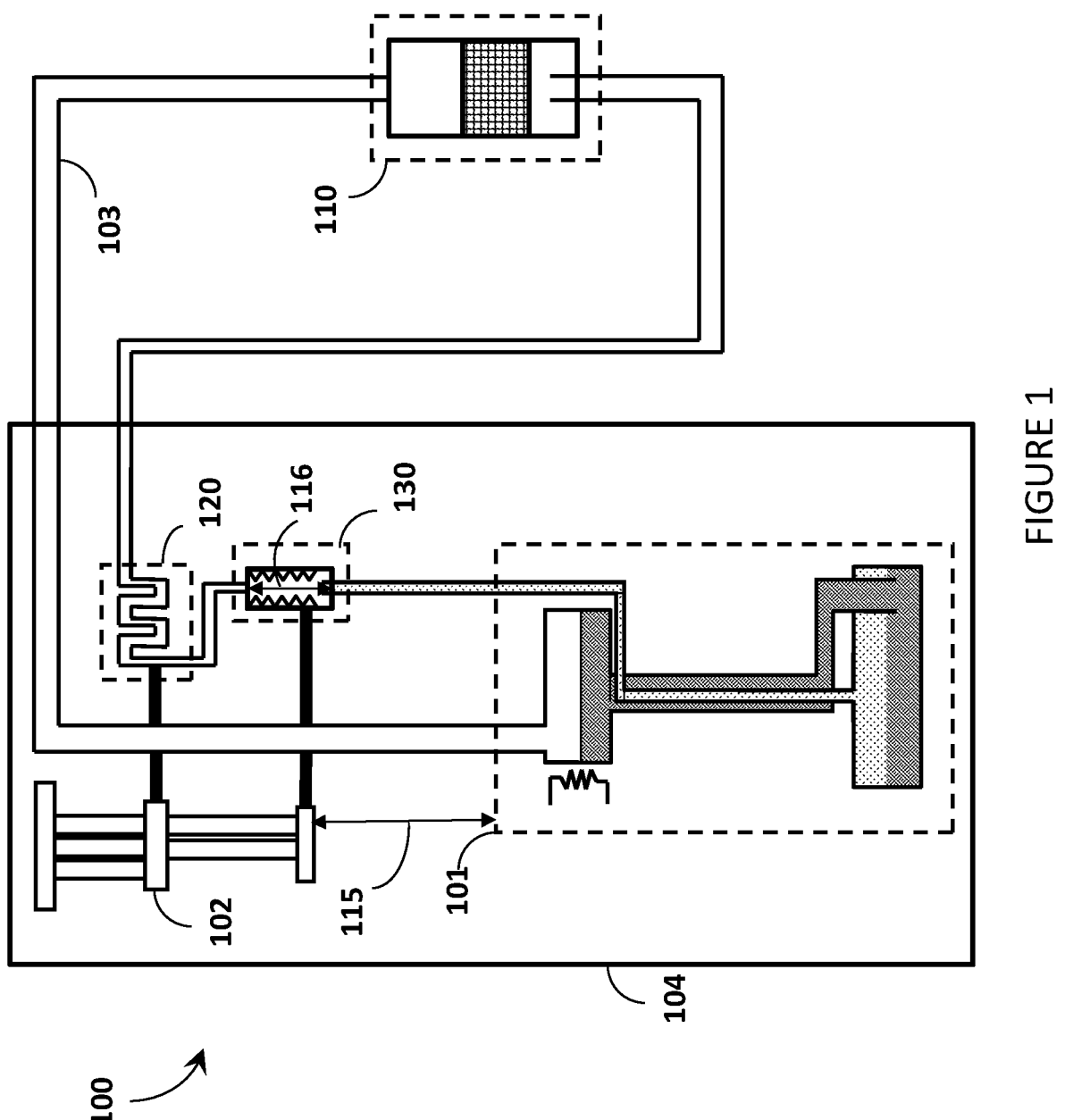
FIG. 1 is a schematic diagram of an exemplary dilution refrigeration system employing improved trap designs in accordance with the present systems and methods.

In the following description, some specific details are included to provide a thorough understanding of various disclosed embodiments. One skilled in the relevant art, however, will recognize that embodiments may be practiced without one or more of these specific details, or with other methods, components, materials, etc. In other instances, well-known structures associated with refrigeration systems, such as heat exchangers, impedances, and control systems including microprocessors, heat switches, drive circuitry and nontransitory computer- or processor-readable media such as nonvolatile memory for instance read only memory (ROM), electronically eraseable programmable ROM (EE-PROM) or FLASH memory, etc., or volatile memory for instance static or dynamic random access memory (ROM) have not been shown or described in detail to avoid unnecessarily obscuring descriptions of the embodiments of the present systems and methods.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment," or "an embodiment," or "another embodiment" means that a particular referent feature, structure, or characteristic described in connection with the embodiment is included in at least one embodiment. Thus, the appearances of the phrases "in one embodiment," or "in an embodiment," or "another embodiment" in various places throughout this specification are not necessarily all referring to the same embodiment. Furthermore, the particular features, structures, or characteristics may be combined in any suitable manner in one or more embodiments.

It should be noted that, as used in this specification and the appended claims, the singular forms "a," "an," and "the" include plural referents unless the content clearly dictates otherwise. Thus, for example, reference to a problem-solving system including "a refrigeration system" includes a single refrigeration system, or two or more refrigeration systems. It should also be noted that the term "or" is generally employed in its sense including "and/or" unless the content clearly dictates otherwise.

The headings provided herein are for convenience only and do not interpret the scope or meaning of the embodiments.

The various embodiments described herein provide systems and methods for improving the performance of cryogenic refrigeration systems. More specifically, the various embodiments described herein provide systems and methods for improved filtering/trapping of contaminants in the helium circuit of a dilution refrigerator.

Most dilution refrigeration systems available today are susceptible to plugging in the helium circuit caused by the freezing out of contaminants that have permeated into the helium itself. For example, a small leak in a pump or portion of tubing in the helium circuit may allow the ingress of air into the helium circuit, and the components of this air may freeze at a temperature at which the helium remains a gas or liquid. The frozen air may adhere to the inner walls of the tubing that forms the helium circuit and plug the circuit. Such plugging will affect, and may completely disrupt, the operation of the dilution refrigerator.

In some applications, it may be desirable for a dilution refrigerator to be capable of continuous operations for on the order of years. For example, in applications of superconducting computing (such as superconducting quantum computation) where the computer processor is cooled by a dilution refrigerator, it may be desirable for the computer processor to remain cold (i.e., operational) for on the order of years. Current dilution refrigeration systems will typically experience a plugging event on shorter timescales (i.e., on the order of days, weeks, or months) and are not well-suited to providing continuous operation for on the order of years. Current dilution refrigeration systems rely on filters or "cold traps" to remove contaminants from the helium in the helium circuit.

Most cold traps available today employ cryoadsorption to essentially extract contaminants from the helium as it flows through the cold trap. Systems and methods for cryoadsorptive cold trapping are known in the art and would be understood by a person of skill in the art. In brief, a cryoadsorptive cold trap comprises a large volume (i.e., the "trap") having an input port and an output port. Tubing of the helium circuit is connected to these ports such that the internal volume of the trap is part of the helium circuit. The trap is cooled to a cryogenic temperature, typically by immersion in a liquid cryogen such as liquid nitrogen. The trap is at least partially filled with a cryoadsorptive material, such as charcoal, activated charcoal, or zeolite. When the cryoadsorptive material is cooled to a sufficiently cold temperature (by thermal coupling to, e.g., the liquid cryogen bath; "sufficiently cold" depends on the specific material being employed) the cryoadsorptive material will adsorb certain substances from its environment. The cryoadsorptive material may be thought of as a sort of "sponge" that soaks up certain materials in its environment and allows other materials to pass through. Whether any given material will be "soaked up" or "pass through" the cryoadsorptive material depends, at least in part, on the temperature of the cryoadsorptive material. Helium can typically only be significantly adsorbed at very cold temperatures (i.e., colder than most other substances), thus, a cryoadsorptive material may be cooled to a temperature at which it does not adsorb helium itself but does adsorb contaminants that may be present in the helium. This is the basis for most modern cold traps.

There are many potential sources of performance degradation in cryoadsorptive cold traps. For example, the liquid nitrogen bath employed to cool the trap may continually boil away nitrogen, causing the level of liquid nitrogen surrounding the trap to fall and reductions/variations in the cooling of the cryoadsorptive material. Cold traps of this form require regular replenishment of liquid nitrogen. Furthermore, many cryoadsorptive materials (such as charcoal) are very poor thermal conductors and not easily thermalized to the temperature of the liquid nitrogen immersion bath. Thus, even if a trap is immersed in liquid nitrogen, there is no guarantee that the cryoadsorptive material within the trap is sufficiently cooled to provide the desired trapping performance. Furthermore, cryoadsorptive cold traps are not designed to accommodate phase changes of contaminants therein. Solidification of contaminants of cold surface of cryoadsorptive material can influence the flow of helium through the trap and can provide "low resistance channels" through which contaminants can flow without being adsorbed.

A further limitation of modern dilution refrigerator/cold trap designs is that they are typically designed as "one trap for all contaminants."

In accordance with the present systems and methods, the performance of a cold trap may be improved by harnessing the effects of cryocondensation as opposed to cryoadsorption and/or by implementing multiple "contaminant-specific" traps each at a specific temperature in the helium circuit.

Cryocondensation is a physical phenomenon whereby molecules of gas encounter a very cold surface and freeze to it. Cryocondensation is, in effect, a mechanism by which blockages and plugging by contaminants may occur within the helium circuit of a dilution refrigerator (as described above). In accordance with the present systems and methods, this mechanism may be used to deliberately trap contaminants in dedicated regions of the helium circuit such that the contaminants do not form blockages that plug the circuit.

A "cryocondensation trap" may be similar to a cryoadsorption trap in that it employs a trapping volume connected in series with the helium circuit via an input port and an output port. However, a cryocondensation trap may not employ a cryoadsorptive material to adsorb contaminants. Instead, a cryocondensation trap may employ a material having a high thermal conductivity and a high specific heat, such as a metal (e.g., copper, stainless steel, silver sinter, brass, bronze, aluminum, etc.) or other material, such as alumina silicate, clay, glass wool, etc. For example, the trapping volume may be formed of such a material and the inner walls of the trapping volume may function as cryocondensation surfaces. In practice, it may be advantageous to provide a large surface area of cryocondensation material. To this end, the inner surface of the trap volume may be rifled, corrugated, textured, finned, etc. or alternatively the inner volume of the trap may include a sintered metal, a screen, a mesh, a wool, or other "perforated" formation that provides a high contact surface area for the helium. Ideally, the cryocondensation material will have a binding energy that matches the contaminant(s) to be trapped but that does not match helium so as to minimize the trapping of helium. The residency of molecules on the cryocondensation surface(s) should be long, e.g., on the order of years.

As described previously, certain contaminants may cryocondense and/or cryoadsorb at a first temperature range and other contaminants may cryocondense and/or cryoadsorb at a second (different) temperature range. For example, water, carbon dioxide, and most hydrocarbons may cryocondense/cryoadsorb at around 77K. Thus, in accordance with the present systems and methods, it may be advantageous to implement a first cold trap at or below about 77K. This first cold trap may employ cryoadsorption or cryocondensation, or a combination of cryoadsorption and cryocondensation. However, nitrogen, oxygen, and argon may cryoadsorb/cryocondense at around 20K. Thus, in accordance with the present systems and methods, it may be advantageous to implement a second cold trap at or below about 20K. This second cold trap may employ cryoadsorption or cryocondensation, or a combination of cryoadsorption and cryocondensation. Here it is noted that a single cold trap at 77K may not be sufficient to trap nitrogen, oxygen and argon, whereas a single cold trap at 20K may be forced to trap too many contaminants and quickly become plugged with water, carbon dioxide, hydrocarbons, nitrogen, oxygen, and argon. In general, a trap that is designed to trap a large number/volume of contaminants must employ a correspondingly large trapping volume to prevent becoming plugged. Furthermore, neon and hydrogen may cryoadsorb/cryocondense at or below about 5K. Thus, in accordance with the present systems and methods, it may be advantageous to implement a third cold trap at or below about 5K. This third cold trap may employ cryoadsorption or cryocondensation, or a combination of cryoadsorption and cryocondensation. Particular care must be taken for a cold trap operating at ~5K to minimize trapping of helium. For example, a cold trap operating at ~5K may employ simple structure, such as a copper tube, to minimize trapping of helium.

In accordance with the present systems and methods, each respective cold trap in a multi-cold trap system may be individually cooled to operation temperature. Some cold traps, such as zeolite adsorption traps for trapping water, may be operated at room temperature. A 77K trap for trapping, e.g., water, carbon dioxide, and most hydrocarbons may be cooled by immersion in liquid nitrogen, or it may be cooled by thermal coupling to a 77K stage of a cryocooler, such as a pulse tube cryocooler. A 20K trap may for trapping, e.g., nitrogen, oxygen, and argon may be cooled by, e.g., thermal coupling to a 20K stage of a cryocooler, such as a pulse tube cryocooler. A 5K cold trap for trapping, e.g., hydrogen and neon, may be cooled by, e.g., thermal coupling to a 5K stage of a cryocooler such as a pulse tube cryocooler. In some implementations, at least one cold trap may be thermally coupled to a cryocooler that is dedicated to the cooling of cold traps. For example, any or all of the 77K trap, the 20K trap, and the 5K trap described above (or any other trap at any other temperature) may be thermally coupled to the corresponding temperature stage of a single pulse tube cryocooler. In implementations where the dilution refrigerator is itself cooled by a pulse tube cryocooler (i.e., for a "pulse tube dilution refrigerator) the same pulse tube that is used to cool the dilution refrigerator may be used to cool any or all of the 77K trap, the 20K, trap, the 5K trap described above, or any other trap at any other temperature. Some implementations may employ at least two pulse tubes, with a first pulse tube used to cool the dilution refrigerator and a second pulse tube used to cool at least one cold trap. If desirable, the first pulse tube may also be used to cool at least one cold trap.

FIG. 1 is a schematic diagram of an exemplary dilution refrigeration system 100 employing improved trap designs 110-130 in accordance with the present systems and methods. Dilution refrigeration system 100 includes dilution refrigerator 101, which is background cooled by a pulse tube cryocooler 102 (thermal coupling between dilution refrigerator 101 and the cold head of pulse tube 102 is not shown in the Figure to reduce clutter). Dilution refrigeration system 100 also includes helium fluid circuit 103 (comprising fluid channels and tubing for helium flow) which passes through a series of three traps: absorptive trap 110, cryocondensation cold trap 120, and cryocondensation cold trap 130. As illustrated, absorptive trap 110 is operated at room temperature; however, in alternative systems absorptive cold trap 110 may be cooled by immersion in a liquid cryogen bath (e.g., liquid nitrogen) or by thermal coupling to a pulse tube cryocooler, such as pulse tube 102 or a second pulse tube separate from pulse tube 102. Adsorptive trap 110 may include, e.g., zeolite or activated charcoal for trapping a specific species or set of species of contaminants, such as water and/or hydrocarbons. Adsorptive trap 110 may employ a desiccant material or a molecular sieve. Absorptive trap 110 is coupled in series with cryocondensation trap 120 in helium circuit 103. Cryocondensation trap 120 is thermally coupled to pulse tube 102 and is formed by a segment of tubing in helium circuit 103 that is serpentine (to enhance surface area) and formed of a material having high thermal conductivity and high specific heat (such as, e.g., copper). Cryocondensation trap 120 may be thermally coupled to pulse tube 102 at a particular temperature (e.g., 20K) that specifically cryocondenses a certain species or set of species of contaminants (e.g., nitrogen, oxygen, and argon). Trap 120 may also cryocondense contaminants that have made it through trap 110, such as water and/or hydrocarbons. Cryocondensation trap 120 is coupled in series with cryocondensation trap 130 in helium circuit 103. Cryocondensation trap 130 is thermally coupled to pulse tube 102 and is formed by a segment of tubing that has a finned or corrugated inner surface (to enhance surface area) and formed of a material having high thermal conductivity and high specific heat (such as, e.g., metal or clay). Cryocondensation trap 130 may be thermally coupled to pulse tube 102 at a particular temperature (e.g., 5K) that specifically cryocondenses a certain species or set of species of contaminants (e.g., hydrogen and neon). Trap 130 may also cryocondense contaminants that have made it through trap 110 and 120, such as water, hydrocarbons, nitrogen, oxygen, and/or argon. In some implementations, it may be advantageous for the helium circuit 103 to return to a higher temperature in between serial traps 120 and 130. Such may allow by-pass valves, etc., to be inserted in the helium circuit so that, e.g., a plugged trap may be isolated and potentially even serviced without warming up the entire fridge.

In some implementations, it may be desirable to couple at least two traps to the same temperature so as to provide redundant trapping mechanisms for contaminants that may be trapped at that temperature.

Dilution refrigeration system 100 also include vacuum can 104 which contains dilution refrigerator 101, pulse tune 102, and traps 120 and 130. Since traps 120 and 130 are contained within the vacuum can 104 that houses dilution refrigerator 101, traps 120 and 130 may be referred to as "internal cold traps" in system 100. Since trap 110 is located outside of vacuum can 104, trap 110 may be referred to as an "external trap."

A further aspect of adsorption traps is that the "sponging" type mechanism by which they operate inevitably results in the adsorptive material becoming saturated such that it can no longer adsorbs contaminants. When this happens, the trap ceases to remove further contaminants from the helium and the fridge may become plugged. To avoid such plugging, adsorptive traps need to be regenerated. Regeneration of an adsorptive trap involves heating the adsorptive material until the contaminants are released. Accordingly, adsorptive traps typically include a vent port through which contaminants may be released during regeneration. The timeframe within which an adsorption trap needs to be regenerated (i.e., the regeneration cycle of the trap) depends on many factors, including the adsorptive material used, the size of the trap, and the type and quantity of contaminants being adsorbed. In accordance with the present systems and methods, if the regeneration cycle of an adsorptive trap is less than the desired cooling cycle of the dilution refrigeration system, then multiple adsorptive traps can be coupled in parallel in the helium circuit such that at least one adsorptive trap is active at all times while the other trap(s) is/are regenerating. In such instances, each trap in a set of parallel traps may each be operated at the same temperature, and if that temperature is colder than room temperature then each trap in a set of parallel traps may be thermally coupleable to the same cold source (e.g., the same pulse tube cryocooler) via a respective thermal switch such that any actively adsorbing trap is thermally coupled to the cold source and any regenerating trap is thermally decoupled from the cold source.

In general, adsorber regeneration is improved as the regeneration temperature is increased. However, if an adsorber had adsorbed hydrocarbons it may be preferable to regenerate only at a temperature that is sufficient to release other contaminants (e.g., water) and not the hydrocarbons themselves, since releasing hydrocarbons may require regenerating at a temperature that is so high that is may damage other trap components (or the adsorber material itself). An adsorption trap that has become saturated with hydrocarbons may be "regenerated" by replacing the adsorption material rather than by baking the trap.

A further limitation of modern cold trap designs is that they provide little or no mechanism for clearly monitoring the performance of the trap. Most dilution refrigerator diagnostics are based on the condensing pressure in the fridge, which provides indirect information about helium flow and overall fridge health. In accordance with the present systems and methods, the performance of cold trap systems may be enhanced by building active gauges into the trap itself, and/or into the helium circuit immediately before and after the trap. Examples of the types of gauges that may be employed include flowmeters, pressure gauges, and contaminant sensors such as water sensors, nitrogen sensors, and the like. It is also advantageous to automate the operation of traps as much as possible by providing, e.g., remotely controlled sensors, gauges, and/or valves and switches, etc., as needed.

The present systems and methods provide individual cold trap designs and systems of multiple cold traps coupled in series and/or parallel in order to enhance the removal of contaminants from the helium circuit in a dilution refrigerator and extend the operating time of the dilution refrigerator. However, similar effects may be achieved by redesigning portions of the helium circuit that are prone to blocking (e.g., narrow tubes, right angles or otherwise unfavorable geometries, etc.) and/or by minimizing air/contaminant ingress into the helium circuit. An example of how to minimize air ingress into the helium circuit is to replace all elastomer seals/gaskets (e.g., O-rings, etc.) with metal seals (e.g., solder) or other seal types having lower permeability.

In some implementations, higher temperature traps may be thermally coupled to the regenerator of a pulse tube to take advantage of available cooling power that is otherwise unused.

Most adsorption traps typically seen in the art employ a single mass of adsorption material contained in a large reservoir volume. This inevitably results in the formation of preferential flow paths through the adsorption material such that only a fraction of the adsorptive surface is actually encountered by the flowing gas (e.g., helium). Also, since adsorptive materials (e.g., charcoal) are typically not good thermal conductors (more like insulators), a large mass of adsorption material typically does not thermalize well throughout.

In accordance with the present systems and methods, it may be advantageous to design an adsorptive trap so that the flowing gas is forced to encounter more of the adsorptive material (i.e., as much as possible of the adsorptive material, or at least more than what is achieved in conventional traps). It may also be advantageous to ensure that more of the adsorptive material (again, as much as possible of the adsorptive material, or at least more than what is achieved in conventional traps) is thermalized to the desired temperature.

Figure 2:
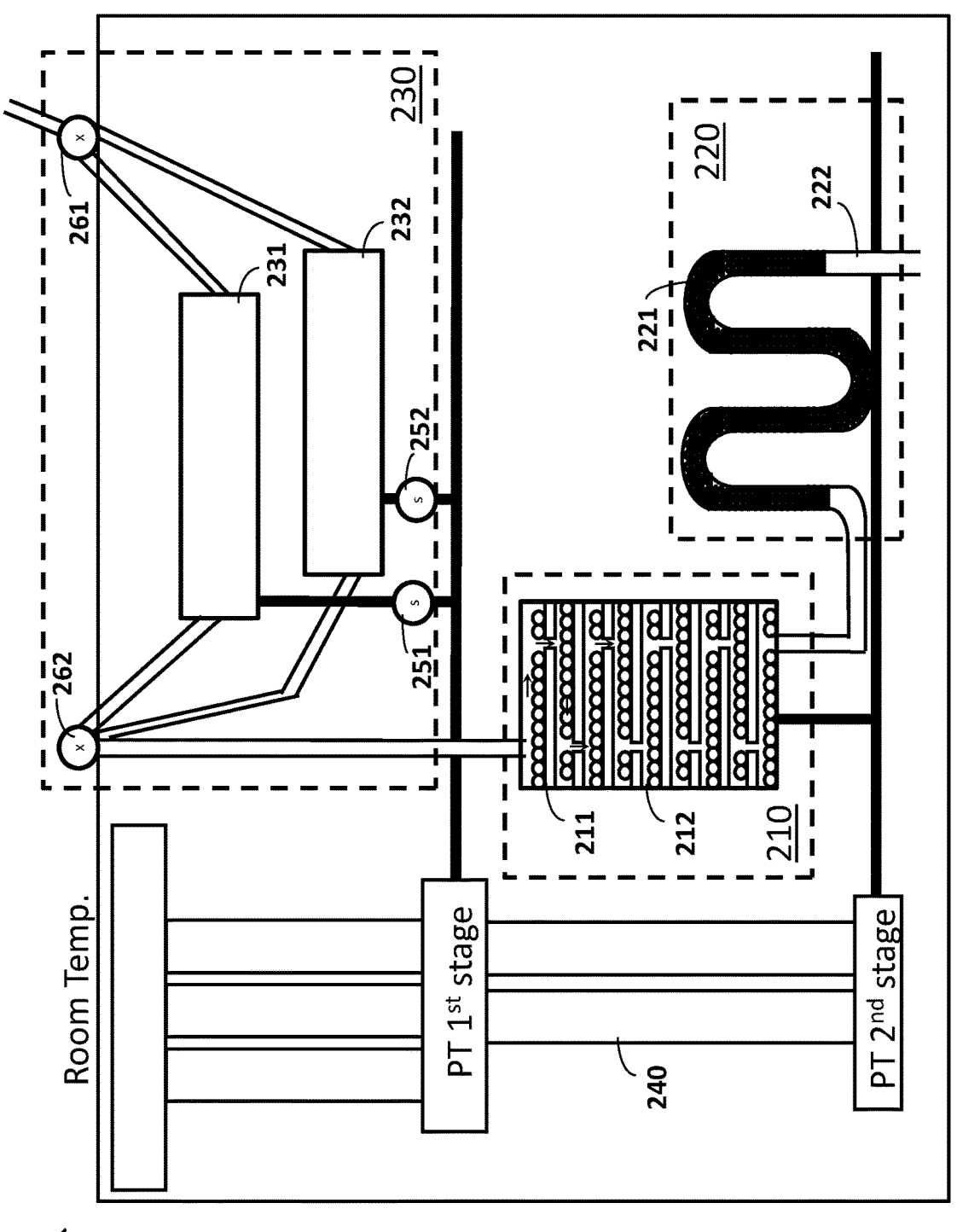
FIG. 2 is a schematic diagram of a cryogenic trapping system in accordance with the present systems and methods.

FIG. 2 is a schematic diagram of a cryogenic trapping system 200 in accordance with the present systems and methods. Cryogenic trapping system 200 includes cryoadsorptive trap 210, in which the large reservoir volume of typical adsorption traps is replaced by a circuitous route (either using a single serpentine tube or by creating staggered openings as illustrated). The circuitous route (a portion of which is indicated by the arrows in trap 210) increases the effective surface area of the adsorptive material 211, meaning that the flowing gas encounters more adsorptive material and there is better coupling between the adsorptive material and thermalization surfaces, e.g., thermalization surface 212. The flowing gas must pass over/through a greater proportion of adsorbing material 211 than in typical single-mass traps, and adsorptive material 211 is also generally more effective because it is uniformly colder. The circuitous route also serves to increase the residency time in the trapping volume of adsorption trap 210. As a result, there is better coupling between flowing gas and adsorptive material 211 because of at least: i) the increased surface area (i.e., effective quantity of) of adsorptive material 211; ii) adsorptive material 211 is better thermalized (via thermalization surfaces 212) and so adsorbs more efficiently; and iii) the circuitous route of the flow path forces the gas to pass through/explore more of the reservoir volume, thus keeping the gas in proximity to adsorptive material 211 for a longer time. Any or all of these features can be exploited in alternative trap designs, where the design shown in trap 210 of FIG. 2 is just an example of one design in accordance with the present systems and methods.

Cryogenic trapping system 200 also includes cryocondensation trap 220 that has a high surface area or condensation material 221. Condensation trap 220 effectively replaces a portion of tubing that is normally present in dilution refrigeration systems. The tubing that is normally used is this part of the helium circuit is typically very narrow in diameter and it only takes a relatively small amount of contaminant to form a blockage therein. Condensation trap 220, this narrow tubing is replaced with large diameter tubing 222 that is at least partially filled with high surface area condensation material 221 such as metal/glass mesh/foam. Tubing 222 may be thermalized to one specific temperature, or have dedicated sections thermalized to specific temperatures, or be thermalized to multiple temperatures to establish a temperature gradient over the trapping surface. Providing trapping surfaces at multiple temperatures (or over a gradient of temperatures) may help ensure multiple contaminant material are captured. The combination of increased volume in tubing 222 and added condensation surface area (221) within the tubing may be designed to have a low net effect on the impedance of this tubing section in the fridge.

Cryoadsorption trap 210 and cryocondensation trap 220 of cryogenic trapping system 200 may be used to form a "fine" trap at or below the 1st pulse tube stage and down to the 2nd pulse tube stage in a PTDR (both are illustrated as being thermalized to the first stage of pulse tube 240 in FIG. 2). A fine" trap may operate a very cold temperatures where contaminants such as Ne and H may be trapped. Such contaminants represent a relatively low percentage of contaminants in the flowing gas. A "coarser" trapping subsystem may be used to remove higher-percentage contaminants from the flowing gas at higher temperature. For example, cryogenic trapping system 200 also includes coarse trapping subsystem 230 in which at least two parallel trapping subsystems 231, 232 are coupled to a higher temperature point in the fridge, such as the 1st pulse tube stage. The two parallel trapping subsystems 231, 232 may be similar to and/or include portions of trap 210 and/or trap 220, and/or may employ other cryoadsorption and/or cryocondensation trapping designs. Parallel trapping subsystems 231,232 may be configured so that one may be active while the other regenerates, and their relative roles may be controlled by switches (e.g., heat switches 251 and 252 that respectively provide controllable thermal coupling between trapping subsystems 231, 232 and the 1st stage of pulse tube 240) and valves (e.g., valves 261 and 262). The operation of parallel cryogenic devices (wherein one device is active and thermally coupled to a cold source while the other device regenerates and is thermally decoupled from the cold surface) would be understood be one of skill in the art. Parallel trapping subsystems 231 and 232 each provide "coarse" filtering of the flowing gas to remove, e.g., $H_2O$, $CO_2$, $N_2$, $O_2$, oils, etc. that can be cryoadsorbed/cryocondensed at relatively warmer temperatures (i.e., warmer than the temperatures at which Ne and H cryoadsorb/cryocondense) so that these more prevalent contaminants do not make it through to the "fine" traps below (i.e., traps 210 and 220). While one of parallel traps 231, 232 is operating, the other may be regenerated (by valving off from the system via the corresponding one of valves 261, 262; decoupling from the cooling source via the corresponding one of heat switches 251, 252; and applying heat to the regenerating trap) and the contaminants that were trapped may be vented out of the system via a vent port (not shown to reduce clutter).

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other methods of quantum computation, not necessarily the exemplary methods for quantum computation generally described above.

The various embodiments described above can be combined to provide further embodiments. All of the U.S. patents, U.S. patent application publications, U.S. patent applications, International (PCT) patent applications referred to in this specification and/or listed in the Application Data Sheet are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A cryogenic trapping system comprising:
    a helium fluid circuit;
    a pulse tube cryocooler comprising a first temperature stage and a second temperature stage, the first temperature stage operating at a first temperature and the second temperature stage operating at a second temperature that is less than the first temperature;

a first trapping subsystem incorporated into the helium fluid circuit, the first trapping subsystem comprising first and second contaminant traps arranged in parallel and selectively thermally coupled to the first temperature stage of the pulse tube cryocooler by respective first and second heat switches, the first and second heat switches providing controllable thermal coupling between the first and second contaminant traps and the first temperature stage of the pulse tube cryocooler;

a cryoadsorptive trap incorporated into the helium fluid circuit in series with the first trapping subsystem, the cryoadsorptive trap thermally coupled to the second temperature stage of the pulse tube cryocooler, the cryoadsorptive trap comprising:

a plurality of thermalization surfaces arranged to define a circuitous flow route through the cryoadsorptive trap; and an adsorption material arranged along the circuitous flow route; and a cryocondensation trap incorporated into the helium fluid circuit in series with the cryoadsorptive trap, the cryocondensation trap comprising a trapping surface, the cryocondensation trap thermally coupled to the second temperature stage of the pulse tube cryocooler.

2. The cryogenic trapping system of claim 1, wherein the cryocondensation trap is thermalized to have a temperature gradient over the trapping surface.

3. The cryogenic trapping system of claim 1, wherein the cryocondensation trap comprises a length of tubing that is at least partially filled with a cryocondensation material.

4. The cryogenic trapping system of claim 3, wherein the cryocondensation material comprises at least one of metal, glass mesh, and foam.

5. The cryogenic trapping system of claim 1, wherein the first and second contaminant traps each employ at least one of cryoadsorption and cryocondensation.

6. The cryogenic trapping system of claim 1, further comprising first and second valves in fluid communication between room temperature and a respective one of the first and second contaminant traps.

7. The cryogenic trapping system of claim 1, wherein the cryoadsorptive trap removes primarily Ne and H from a fluid flow.

8. The cryogenic trapping system of claim 1, wherein the cryocondensation trap removes primarily Ne and H from a fluid flow.

9. The cryogenic trapping system of claim 1, wherein the first and second contaminant traps remove primarily one or more of $H_2O$, $CO_2$, $N_2$, $O_2$, and oils from a fluid flow.

10. The cryogenic trapping system of claim 1, wherein the first temperature stage of the pulse tube cryocooler is at or below 20K.

11. The cryogenic trapping system of claim 1, wherein the second temperature stage of the pulse tube cryocooler is at or below 5K.

12. The cryogenic trapping system of claim 1, wherein the cryoadsorptive trap is connected to the cryocondensation trap by a first length of tubing of the helium fluid circuit, and wherein the cryocondensation trap comprises a second length of tubing of the helium fluid circuit, the second length of tubing having a diameter that is greater than a diameter of the first length of tubing.

13. The cryogenic trapping system of claim 1, wherein the adsorption material comprises one of charcoal, activated charcoal, or zeolite.

14. The cryogenic trapping system of claim 1, further comprising at least one gauge connected in series with the helium fluid circuit, the at least one gauge selected from a group consisting of: flowmeters, pressure gauges, and contaminant sensors.

* * * * *